No. 851,441.
PATENTED APR. 23, 1907.
C. W. ROBINSON.
DUST PAN.
APPLICATION FILED DEC. 7, 1906.
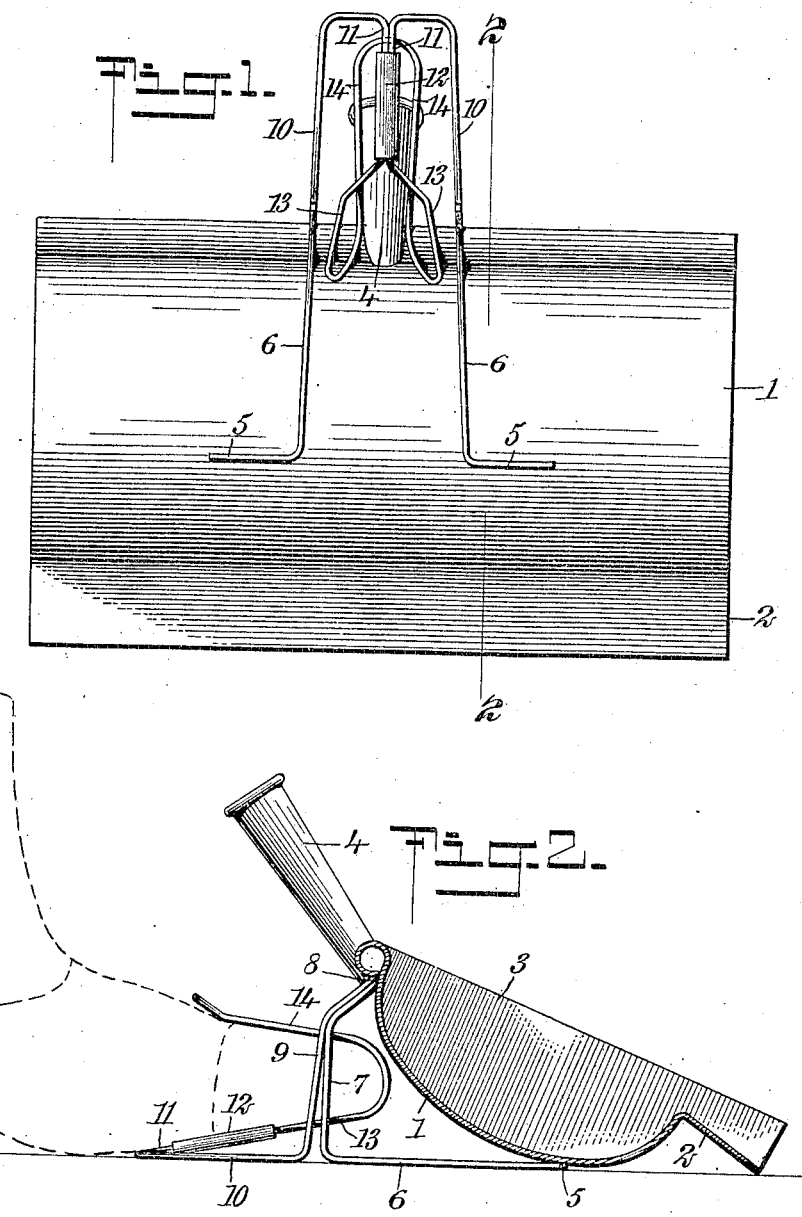
WITNESSES
INVENTOR
Charles W. Robinson
BY
ATTORNEYS

UNITED STATES PATENT OFFICE.

CHARLES WESLEY ROBINSON, OF SAN DIEGO, CALIFORNIA.

DUST-PAN.

No. 851,441.     Specification of Letters Patent.     Patented April 23, 1907.

Application filed December 7, 1906. Serial No. 346,705.

*To all whom it may concern:*

Be it known that I, CHARLES WESLEY ROBINSON, a citizen of the United States, and a resident of San Diego, in the county of San Diego and State of California, have invented a new and Improved Dust-Pan, of which the following is a full, clear, and exact description.

This invention relates to dust pans, and has for its object to provide means simple in construction, effective in operation and adapted to be used and controlled by the foot or hand of a user. This I accomplish by the means illustrated in the accompanying drawings, in which drawings like characters of reference indicate like parts throughout the views, and in which Figure 1 is a plan view of the under side of a device embodying my invention; and Fig. 2 is a vertical transverse section taken on the line 2—2 of Fig. 1.

As illustrated in the drawings, the pan is constructed with a body 1 curved transversely, and provided with a flange 2 extending downwardly from the forward edge of the body of the pan, and adapted to bear at its lower edge against the surface of the object to which it is applied. The body is provided with ends 3 which extend transversely of the curved or dished portion 1 and flange 2, so as to serve as guards for the ends of the flange, as well as end portions of the body itself. The pan is provided with a handle 4, and a frame adapted to hold the pan in an inclined position with the lower edge of the flange 2 in contact with the object to be dusted. This frame, as shown in the drawings, is composed of a single piece of wire having off-set ends 5 secured to the bottom of the body of the pan and rods 6 extending backward from the body of the pan so as to form a support therefor. From the rods 6 the frame extends upward in the form of vertical rods 7, which are doubled over on themselves at their upper ends 8 where they are secured to the upper portion of the body of the pan by means of solder or other suitable means, and continue downward in the form of rods 9 which are off-set at their lower ends into horizontal portions 10 arranged in alignment with the rods 6. From the rods 10 the frame extends inward in substantially parallel rods 11, which are secured together by means of a clamp 12, as shown in Fig. 1. The frame rods projecting through the forward end of the clamp or sleeve 12 separate into similar opposite members 13 and 14 forming a stirrup adapted to receive a foot, as indicated by dotted lines in Fig. 2. The stirrup may be made of resilient material so as to more readily clamp and cling to the foot of the person using the same.

By means of such construction a supporting frame is provided for the dust pan adapted to hold the pan at the desired inclination with its forward edge in contact with the floor, and a stirrup is also provided extending transversely of the pan, which although connected with the supporting frame operates entirely independently thereof, and is constructed with a free upper extremity, thereby enabling the stirrup to conform to the foot of the user and clamp the foot evenly and enable the dust pan to be moved about without being jarred and scattering any of its contents on the floor.

Having thus described my invention, what I claim as new and desire to secure by Letters Patent is:—

1. A dust pan comprising a dished body having a longitudinal flange formed on its forward portion, a frame secured to the under side and back of said pan, and a stirrup constructed of resilient material extending transversely of said pan and connected with said supporting frame, substantially as shown and described.

2. A dust pan having a dished body provided with a longitudinal flange formed on the forward portion of said body, a frame secured to the lower portion and back of said body adapted to support said body in an inclined position, and a stirrup connected with said frame and provided with a free upper end, substantially as shown and described.

In testimony whereof I have signed my name to this specification in the presence of two subscribing witnesses.

CHARLES WESLEY ROBINSON.

Witnesses:
   JOHN B. MANNIX,
   ELISHA S. TORRANCE, Jr.